Feb. 17, 1925.
H. W. WISHART
COMPRESSOR
Filed Feb. 3, 1922
1,526,449
3 Sheets-Sheet 1
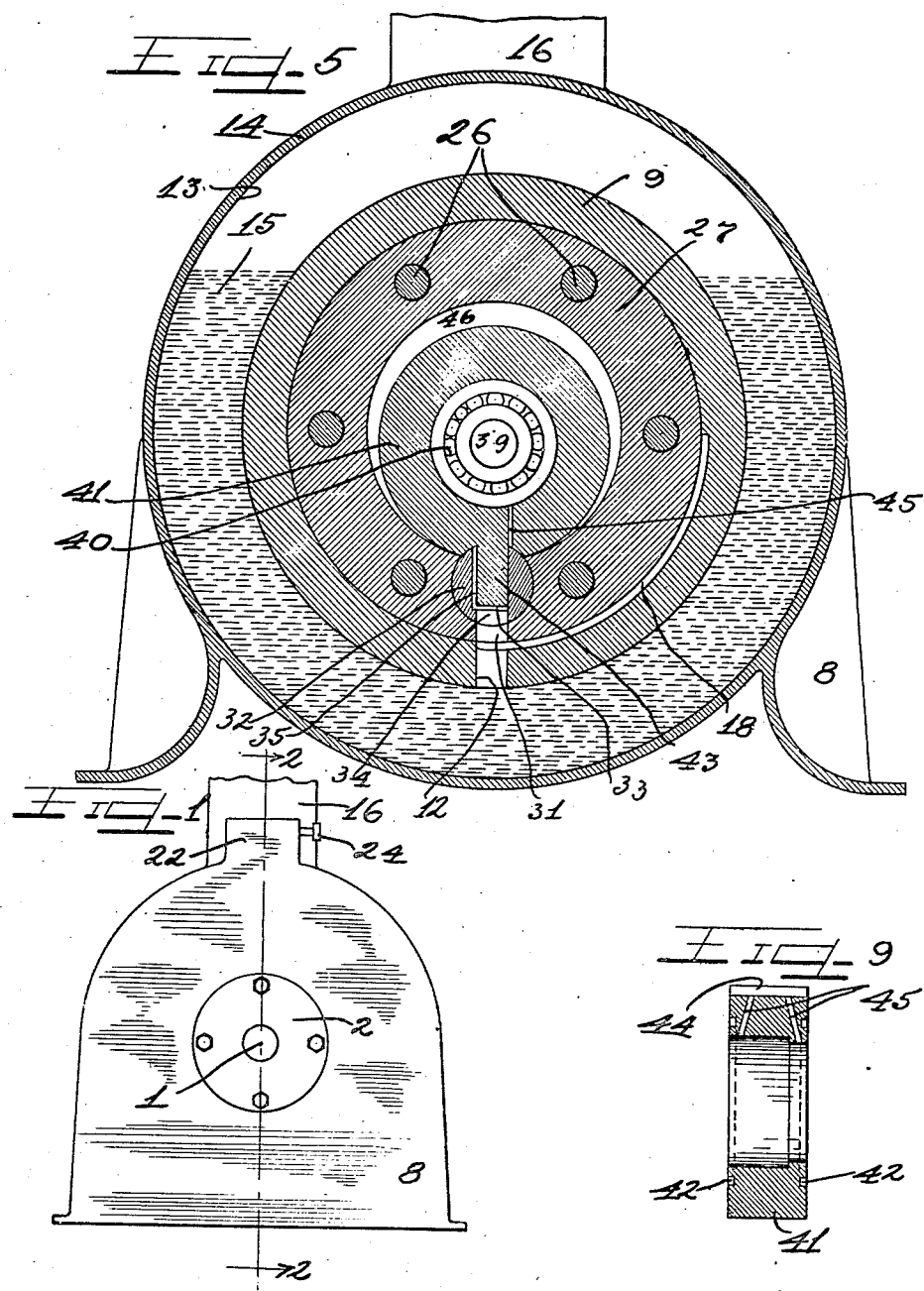

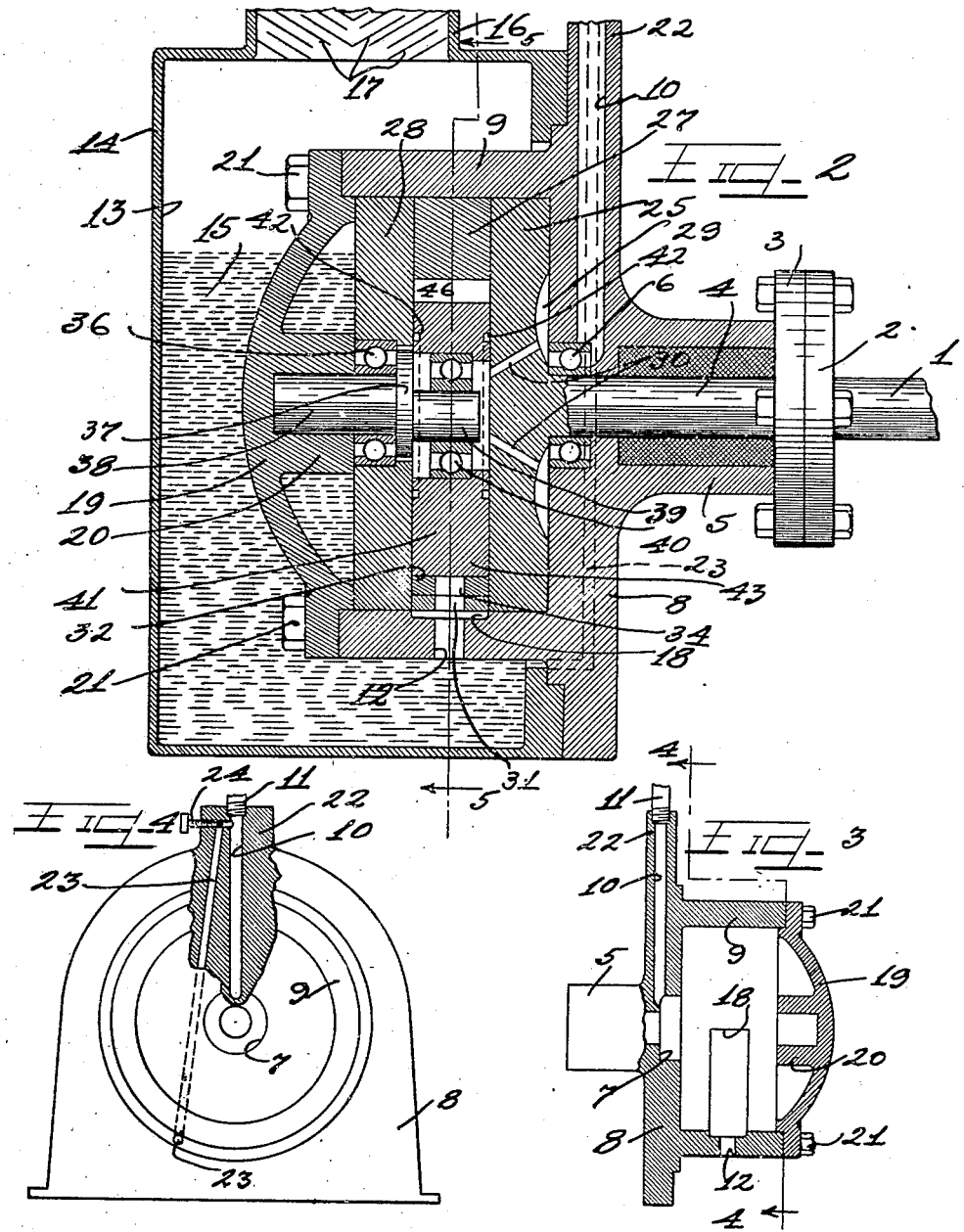

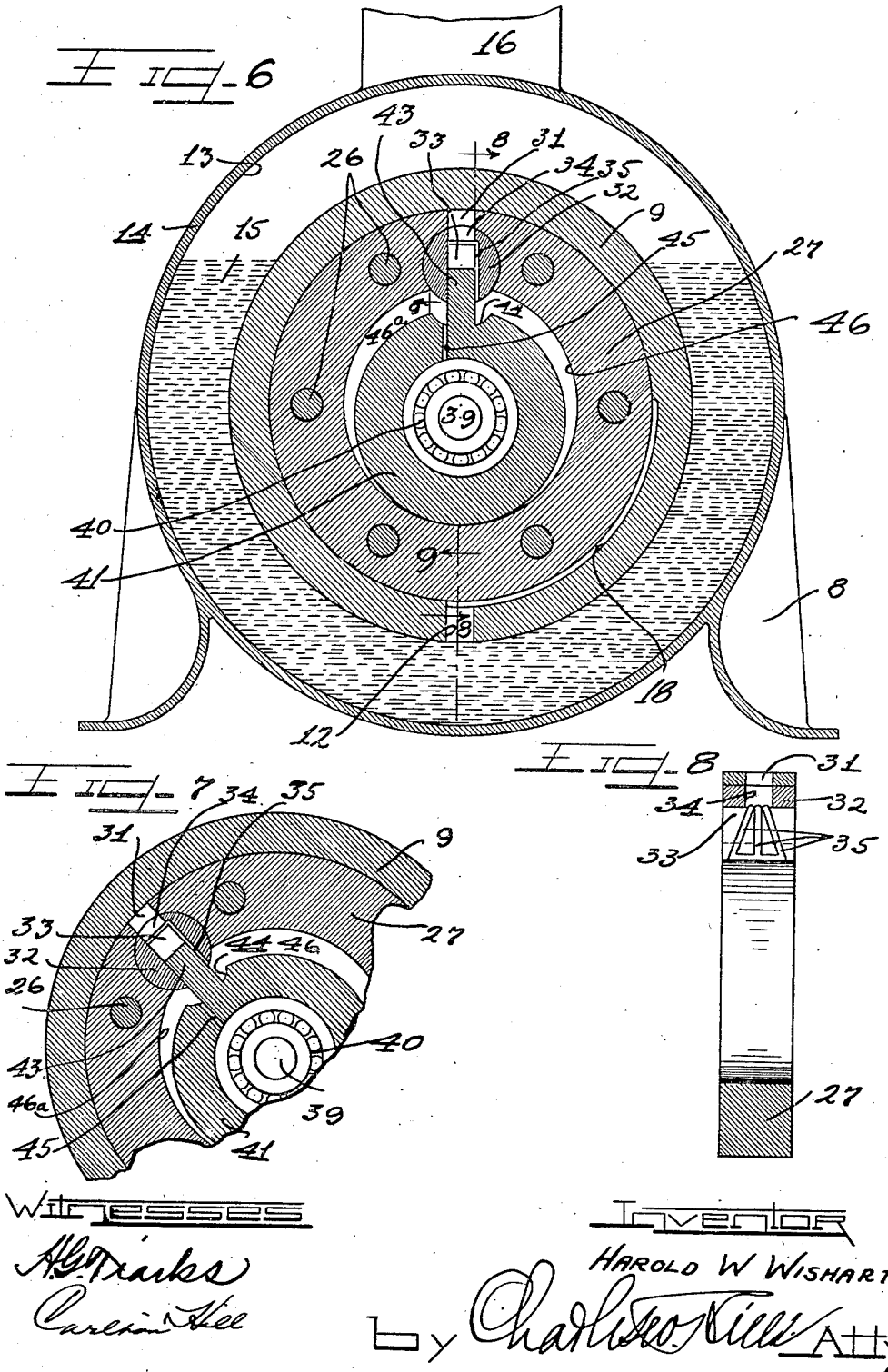

Patented Feb. 17, 1925.

1,526,449

UNITED STATES PATENT OFFICE.

HAROLD W. WISHART, OF CLINTON, IOWA, ASSIGNOR, BY MESNE ASSIGNMENTS, TO CLIMAX ENGINEERING COMPANY, OF CLINTON, IOWA, A CORPORATION OF DELAWARE.

COMPRESSOR.

Application filed February 2, 1922. Serial No. 533,735.

*To all whom it may concern:*

Be it known that I, HAROLD W. WISHART, a citizen of the United States, and a resident of the city of Clinton, in the county of Clinton and State of Iowa, have invented certain new and useful Improvements in a Compressor; and I do hereby declare that the following is a full, clear, and exact description of the same, reference being had to the accompanying drawings, and to the numerals of reference marked thereon, which form a part of this specification.

This invention relates to an improved type of compressor wherein a fluid or gas entering the compressor casing is permitted to flow through a rotary member and through a rotatable eccentric into a space between the rotary member and said eccentric to be compressed and then forced out through control valve openings in said casing into a bath of lubricant contained in a chamber provided in a housing enclosing the compressor casing.

It is an object of this invention to provide a compressor wherein a driving cylinder is adapted to operate an eccentrically controlled rotor to cause compression of a medium and then force said compressed medium out from between the cylinder and rotor through a coacting rocker and vane and then through casing valve openings into a lubricant from which the medium is permitted to escape.

It is also an object of the invention to provide a compressor wherein a refrigerating fluid or gas is compressed between simultaneously rotatable members one of which is eccentric with respect to the other and has a vane which slidably engages in a rocker movably mounted within the other of said rotatable members from which the compressed refrigerating fluid or gas escapes through a valve mechanism into a lubricant from which the compressed refrigeration fluid or gas is permitted to escape.

Another object of the invention is to provide a compressor wherein a housing has a bath of lubricant therein within which a casing is submerged containing relatively movable coacting members adapted to compress a gas and then force the same out of the casing through the lubricant into a suitable container for holding the compressed gas.

It is a further object of this invention to provide a compressing device wherein a compressor is mounted within a housing containing a lubricant which acts as a seal and permits proper lubrication of the operating parts of the compressor, said device also permitting a gas entering the compressor to be compressed and then forced into the lubricant from which it is permitted to escape through a lubricant and gas separator.

It is furthermore an object of the invention to mount a compressor in a housing containing a sealing lubricant to insure positive lubrication of the compressor mechanisms when the same are operating to compress a gas which when compressed is discharged through the lubricant in said housing.

It is an important object of this invention to provide a compressor of simple and effective construction adapted to first compress a medium between relatively movable members and then force the compressed medium from between the relatively movable members out through a valve mechanism to permit the compressed medium to escape through a fluid contained in a housing surrounding the compressor, said fluid being permitted to mix with the medium and act as a lubricant for the operating members as well as a seal for preventing the leakage of the compressed gases.

Other and further important objects of this invention will be apparent from the disclosures in the specification and drawings.

The invention (in a preferred form) is illustrated in the drawings and hereinafter more fully described.

On the drawings:

Figure 1 is an end elevation of a compressor embodying the principles of this invention.

Figure 2 is an enlarged detail section taken on line 2—2 of Figure 1, showing parts in elevation.

Figure 3 is a longitudinal vertical section of the compressor casing with the interior mechanism omitted.

Figure 4 is a view taken on line 4—4 of Figure 3, with parts broken away and shown in section.

Figure 5 is a section taken on line 5—5 of Figure 2.

Figure 6 is a similar section showing the cylinder and rotor rotated through one hundred and eighty degrees.

Figure 7 is a fragmentary section similar to Figure 6, showing another position of the operating mechanisms.

Figure 8 is a detail section taken on line 8—8 of Figure 6.

Figure 9 is a detail section taken on line 9—9 of Figure 5.

As shown on the drawings:

The reference numeral 1 indicates a driving shaft having integrally formed or rigidly secured at one end thereof a flange or plate 2 to which is rigidly bolted the flange or plate 3 of a compressor shaft 4. The compressor shaft 4 projects through a sleeve 5 and through a bearing 6 mounted within a recess 7 provided in the rear mounting wall 8 of a compressor casing 9. The sleeve 5 has a packing therein adapted to be saturated with the lubricant to afford a seal obviating the leakage of gases from the compressor casing. Formed radially in the casing back wall 8 is an inlet passage 10, the inner end of which communicates with the recess 7. A feed pipe 11 has one end secured in the outer end of the inlet passage 10 and the other end connected with a source of supply of a medium to be compressed. Provided in the lower portion of the casing 9 is a valve outlet port or passage 12 which communicates with a chamber 13 provided in a housing 14. The housing 14 is rigidly secured to the rear wall 8 and encloses the casing 9, as illustrated in Figure 2. The housing is partially filled with a lubricant 15. Formed on the top of the housing 14 is a flue or pipe 16 having a plurality of baffle plates 17 therein. The pipe 16 is adapted to be connected up with a storage tank, reservoir or other container adapted to receive the compressed medium from the compressor.

The inner end of the outlet passage 12 connects with a valve groove 18 formed in the inner peripheral surface of the casing 9. Closing the open end of the casing 9 is a head or cover plate 19 having an axial sleeve 20 integrally formed centrally therein. The cover plate 19 is securely attached to the casing 9 by means of screw bolts 21 or other suitable means. As illustrated in Figure 4, the back wall 8 has a projection or boss 22 integrally formed thereon to which the feed pipe 11 is connected. Provided in the casing back wall 8 is an auxiliary lubricant feed passage 23, the upper end of which is in the boss 22 and communicates with the upper portion of the inlet passage 10. The lower end of the auxiliary passage 23 communicates with the chamber 15 of the housing 14, as shown in Figures 2 and 4. A needle valve 24 is mounted on the boss 22 and projects into the auxiliary passage 23 to control the passage of lubricant therethrough.

Rotatably mounted within the casing 9 is a cylinder comprising a disk or circular plate 25 which is integrally formed on the inner end of the compressor shaft 4. Rigidly secured to the plate 25 by screw bolts 26 or other means is a spacing ring 27 and a disk or plate 28. The spacing ring 27 is clamped between the plates 25 and 28, as illustrated in Figure 2. The cylinder coacting with the casing openings 18 and 12 acts as a valve for governing the flow of a compressed medium into the bath of lubricant 16. The plate 25 is provided with a circular groove 29 in the outer surface thereof. Also provided in the plate 25 near the center thereof are a plurality of inclined intake passages 30, the outer ends of which communicate with the plate groove 29. The inner ends of the intake passages 30 open into the chamber of the cylinder. The spacing ring 27 is provided with a radial outlet passage or opening 31, the inner end of which communicates with a cylindrical rocker opening provided transversely in the ring 27 to the inside of the outlet opening 31. Movably mounted within the rocker opening of the spacing ring 27 is a cylindrical rocker 32 having a longitudinal slot or opening 33 therein. An outlet opening 34 is provided in the rocker 32 and registers with the spacing ring outlet opening 31. Part of the rocker 32 projects through the inner peripheral surface of the ring 27. Provided in one of the walls of the rocker 32 are a plurality of outlet grooves 35 which converge and communicate with the rocker opening 34.

The cylinder plate 28 is provided with a central opening within which is mounted a bearing 36 and a disk 37. Integrally formed centrally on the outer side of the disk 37 is a stub shaft 38 which is journalled in the ball bearing 36 and is rigidly fixed in the sleeve 20 of the casing cover 19. Integrally formed at right angles on the inner side of the disk 37 is an eccentric pin 39. A bearing 40 is engaged on the eccentric pin 39. Engaged on the bearing 40 is a piston or rotor 41 which is centrally and rotatably mounted thereon and thereby eccentrically positioned with respect to the aligned shafts 4 and 38. The rotor 41 is positioned within the spacing ring 27 between the plates 25 and 28. The rotor 41 is adapted to have a portion of the outer periphery thereof contacting the inner periphery of the cylinder spacing ring 27 at all times. Each side of the rotor 41 is provided with a circular lubricant groove 42. Integrally formed radially on the rotor 41 and projecting outwardly therefrom into the slot 33 of the rocker 32 is a vane 43. The rotor 41 is notched at 44 to permit it to engage over the projecting portion of the rocker 32 as illustrated in Figure 5. A plurality of inlet passages or ports 45 are provided in the rotor 41 and connect the inner openings of the rotor with the notch 44 to permit a medium such as a gas to flow into the crescent-shaped compression chamber 46 formed between the rotor 41 and the cylinder.

The operation is as follows:

The compressor is adapted to be operated by the driving shaft 1 which causes rotation of the compressor shaft 4 connected therewith. Rotation of the shaft 4 acts to rotate the compressor cylinder 25—27—28 which in turn acts to rotate the rotor 41. During the rotation of the cylinder, the rotor 41, being mounted on the eccentric pin 39, is turned with the cylinder by means of the vane 43. As the rotor is off center it has a continuous rolling contact of its outer periphery with the inner circumference of the cylinder. During the rotation of the rotor 41, the rotor vane 43 has a sliding movement with respect to the rocker 32.

A fluid or gas to be compressed is permitted to enter the compressor by way of the pipe 11 and the inlet passage 10 and flows through the bearing 6 into the cylinder groove 29. From the groove 29, the gas passes through the passages 30 into the space provided within the rotor 41. Looking at Figure 5, the cylinder rotates in a clockwise direction carrying the rotor 41 with it. The vane 43 slides inwardly towards the center of the compressor and the point of contact between the rotor 41 and the inner peripheral surface of the cylinder advances with the movement of the cylinder. The rotor ports 45 are thus opened to permit the gas within the rotor 41 to start to flow into the crescent-shaped compression chamber 46ª being formed on the intake side of the rotor vane 43. As the cylinder rotates from the position shown in Figure 5, the cylinder outlet opening 31 moves out of register with the valve discharge opening 12, and is thus closed by the casing. Gas is thereby trapped within the chamber 46 and is gradually compressed as the chamber 46 decreases in size with the increase in size of the filling chamber 46ª.

During a portion of a revolution of the cylinder, the gas in the chamber 46 is compressed until the cylinder outlet opening 31 reaches the valve groove 18 of the casing 9.

When this point is reached, the compressed gas in the chamber 46 starts to discharge through the valve groove 18 and flows from the compressor through the valve outlet port or passage 12 discharging into the bath of lubricant 15 within the housing 14. Discharge of the compressed gas into the housing 14 thus takes place during a portion of each turn of the cylinder and rotor, or until the cylinder opening 31 passes the valve outlet opening 12.

It will be noted that while the chamber 46ª on the intake side of the rotor vane 43 is being filled and increases in size, gas trapped within the chamber 46 on the compression or outlet side of the rotor vane 43 is first gradually compressed for a portion of a turn of the cylinder and is then positively discharged from the compressor casing during the last portion of the turn of the cylinder. The novel construction of the compressor causes the positive ejection of the compressed gases and thereby obviates any gases from remaining in the compression chamber 46 from expanding to prevent complete filling of the chamber 46 with a new charge during the next cycle of operation.

As the compressed gases are discharged into the housing 14, they mix with the lubricant 15 and gradually travel upwardly therethrough into the upper portion of the housing chamber 13 and escape through the discharge pipe or flue 16. In passing into the flue 16, the compressed gases pass between the baffle plates 17, thereby causing the gases to be separated from any particles of lubricant which might still be mixed therewith. The compressed gases passing outwardly through the flue 16 are permitted to enter a tank or other container.

To insure positive lubrication of the operating parts of the compressor, the auxiliary passage 23 is provided in the casing wall 8. One end of the auxiliary passage connects with the housing chamber 13 and permits the lubricant to be forced by pressure upwardly into the inlet passage 10. The suction caused by the compressor when in operation acts to draw the gases through the inlet passage 10 into the compressor to be compressed. While a regulating valve 24 is illustrated to control the flow of lubricant into the passage 10, it will, of course, be understood that any other type of control mechanism may be used.

The lubricant entering the gas inlet passage 10 mixes with the entering gases and passes into the compressor cylinder and acts as a liquid seal to prevent leakage of gases.

I am aware that numerous details of construction may be varied through a wide range without departing from the principles of this invention, and I therefore do not purpose limiting the patent granted otherwise than necessitated by the prior art.

I claim as my invention:

1. A compressor comprising a stationary housing containing a lubricant, a stationary casing projecting therein, a cylinder rotatable in said casing, a rocker in said cylinder, an eccentric in said cylinder rotatable therewith, and a vane on said eccentric having a sliding engagement with said rocker.

2. A compressor comprising a stationary housing containing a lubricant, a stationary casing projecting therein having intake and outlet passages therein, a cylinder in said casing, means for rotating the same, an eccentric in said cylinder having a sliding engagement with said cylinder and adapted to rotate with the cylinder, said cylinder and eccentric adapted to receive a medium therebetween from said intake passage, compress the medium and then discharge the same through said discharge passage.

3. A compressor comprising a stationary casing, a cylinder in said casing, a fixed eccentric pin in said casing projecting into the cylinder, and an eccentric member on said pin adapted to rotate with the cylinder and movable relatively thereto.

4. A compressor comprising a stationary casing, a cylinder concentrically mounted to rotate therein, a fixed eccentric pin in said casing projecting into the cylinder, an eccentric member on said pin in said cylinder contacting the cylinder at one point to form a crescent-shaped chamber, and a member integral with the eccentric member having sliding engagement with the cylinder when the cylinder and the eccentric member are rotating.

5. A compressor comprising a stationary casing, a cylinder rotatable therein, a shaft fixed in said casing and projecting into said cylinder, a disk on said shaft, a fixed pin eccentrically secured on said disk, and a rotor supported on said eccentric pin within the cylinder.

6. A compressor comprising a stationary casing, a cylinder rotatable therein, means for rotating the cylinder, a bearing supported in said cylinder, a shaft in said bearing and fixed in said casing, a disk secured on said shaft, a fixed pin eccentrically secured on said disk projecting into the cylinder, a bearing on said pin, a rotor supported on said pin bearing, a slotted member movably engaged transversely of the cylinder, and a vane on said rotor projecting into said slotted member.

7. A compressor comprising a casing, a driving shaft, a cylinder in said casing connected to be driven by said driving shaft, a slotted member supported in said cylinder, a rotor in said cylinder, a vane formed thereon and projecting into said slotted member, and a fixed eccentric support for said rotor to cause the vane to slidably move into and out of said slotted member as the rotor is rotated with said cylinder.

8. A compressor comprising a casing having inlet and outlet openings therein, a bearing supported by the casing, a driving shaft projecting into the casing through said bearing, said casing having a groove therein connected with said outlet opening, a cylinder in said casing connected to be driven by said driving shaft, said cylinder having a groove, inlet passages and an outlet opening therein, a slotted member supported in the cylinder, said member having an outlet opening adapted to register with the outlet opening in said cylinder, a bearing supported by the cylinder, a stub shaft in said second bearing and supported by the casing, a disk formed on said stub shaft, an eccentric pin on said disk, another bearing on said eccentric pin, a rotor within said cylinder supported on said last-mentioned bearing, said rotor having outlet passages therein connecting the interior of the rotor with a crescent chamber formed between the rotor and said cylinder, and a vane integral with said rotor having sliding engagement with said slotted member.

9. A compressor comprising a housing having a lubricant therein, a stationary casing therein, a cylinder journalled in said casing, a rocker in said cylinder, a rotor eccentrically mounted in said cylinder, a fixed eccentric pin supporting the rotor, means on said rotor having sliding engagement with said rocker, and means connected with the cylinder to cause rotation of said cylinder and said rotor.

10. A compressor comprising a housing containing a bath of lubricant, a stationary casing secured in said housing having a passage therein to permit lubricant to enter the casing, a cylinder journalled in the casing, a rocker in said cylinder, a fixed eccentric projecting into the cylinder, a rotor journalled on said fixed eccentric within the cylinder, means for driving the cylinder to cause simultaneous rotation of said cylinder and said rotor, and means integral with said rotor having sliding engagement with said rocker.

11. A compressor comprising a housing having a lubricant therein, a flue formed on said housing, baffle plates in said flue, a casing in said housing having a passage therein, a cylinder journalled in said casing, means for driving the same, a rocker in said cylinder, a fixed eccentric projecting into said cylinder, a rotor journalled on said eccentric within the cylinder, and means on said rotor slidably engaged with said rocker.

12. A compressor comprising a casing having a valve outlet opening and a valve groove therein communicating with one another, of a rotatable cylinder in said casing having an outlet opening therein, a fixed eccentric supported by said casing and projecting into said cylinder, a passaged rotor in said cylinder on said fixed eccentric, and means for driving said cylinder and rotor whereby the cylinder acts as a valve to control the flow of a compressed medium from between the cylinder and rotor out of said casing outlet groove and opening.

In testimony whereof I have hereunto subscribed my name in the presence of two subscribing witnesses.

HAROLD W. WISHART.

Witnesses:
 F. E. WOODS,
 JOSEPHINE SULLIVAN.